(12) United States Patent
Baur et al.

(10) Patent No.: US 12,158,521 B2
(45) Date of Patent: Dec. 3, 2024

(54) RADAR SENSOR FOR MOTOR VEHICLES

(71) Applicant: Robert Bosch GmbH, Stuttgart (DE)

(72) Inventors: Klaus Baur, Mietingen (DE); Michael Klar, Magstadt (DE); Michael Schoor, Stuttgart (DE); Osama Khan, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 384 days.

(21) Appl. No.: 17/640,790

(22) PCT Filed: Jul. 28, 2020

(86) PCT No.: PCT/EP2020/071221
§ 371 (c)(1),
(2) Date: Mar. 4, 2022

(87) PCT Pub. No.: WO2021/052662
PCT Pub. Date: Mar. 25, 2021

(65) Prior Publication Data
US 2022/0334245 A1 Oct. 20, 2022

(30) Foreign Application Priority Data
Sep. 17, 2019 (DE) .................. 10 2019 214 164.1

(51) Int. Cl.
*G01S 13/931* (2020.01)
*H01Q 1/32* (2006.01)
*H01Q 21/08* (2006.01)

(52) U.S. Cl.
CPC ......... *G01S 13/931* (2013.01); *H01Q 1/3233* (2013.01); *H01Q 21/08* (2013.01)

(58) Field of Classification Search
CPC ..... G01S 13/931; H01Q 1/3233; H01Q 21/08
See application file for complete search history.

(56) References Cited

U.S. PATENT DOCUMENTS

| 4,238,798 A | 12/1980 | Aitken et al. |
| 5,612,702 A * | 3/1997 | Kinsey ................ G01S 13/4409 342/149 |

(Continued)

FOREIGN PATENT DOCUMENTS

| JP | 2001111332 A | 4/2001 |
| WO | 2017029898 A1 | 2/2017 |

OTHER PUBLICATIONS

James et al., "Microstrip Antennas and Arrays. Pt. 2—New Array—Design Technique," IEE Journal on Microwaves, Optics and Acoustics, vol. 1, No. 5, 1977, pp. 175-181.*

(Continued)

*Primary Examiner* — Vladimir Magloire
*Assistant Examiner* — Brandon James Henson
(74) *Attorney, Agent, or Firm* — NORTON ROSE FULBRIGHT US LLP; Gerard A. Messina

(57) ABSTRACT

A radar sensor for motor vehicles. The radar sensor includes an antenna arrangement having multiple antenna elements linearly arranged at uniform distances along a connecting line, the distance between each two adjacent antenna elements being equal to half of the mean wavelength λ of the emitted radar signal, and the arrangement including at least one triple of adjacent antenna elements, in which the two antenna elements located on the outside in the triple, on the one hand, and the interposed antenna element, on the other hand, originate in opposite directions from the connecting line. The antenna arrangement includes at least one pair of antenna elements which originate in opposite directions from the connecting line and whose distance from one another is an integer multiple of the wavelength λ, so that one of these antenna elements has a negative amplitude taper in relation to the antenna elements of the triple.

6 Claims, 2 Drawing Sheets

(56) References Cited

U.S. PATENT DOCUMENTS

| | | | | |
|---|---|---|---|---|
| 2006/0214867 A1* | 9/2006 | Chen | ......................... | H01Q 1/38 |
| | | | | 343/795 |
| 2012/0119952 A1* | 5/2012 | Pozgay | .................... | H01Q 3/01 |
| | | | | 342/372 |
| 2014/0022140 A1* | 1/2014 | Horst | ..................... | H01Q 13/20 |
| | | | | 343/843 |
| 2016/0036135 A1* | 2/2016 | Hellinger | ............... | H01Q 21/12 |
| | | | | 343/893 |

OTHER PUBLICATIONS

International Search Report for PCT/EP2020/071221, Issued Nov. 3, 2020.

Wu et al., "A 76.5 GHz Microstrip Comb-Line Antenna Array for Automotive Radar System," 2015 9th European Conference on Antennas and Propagation (EUCAP), EURAAP, 2015, pp. 1-3.

Zhang et al., "Millimeter-Wave Microstrip Comb-Line Antenna Array for Automotive Radar," 2018 12th International Symposium on Antennas, Propagation and EM Theory (ISAPE), IEEE, 2018, pp. 1-3.

* cited by examiner

RADAR SENSOR FOR MOTOR VEHICLES

FIELD

The present invention relates to a radar sensor for motor vehicles, including an antenna arrangement which includes multiple linear antenna elements arranged at equal distances along a connecting line, the distance between each two adjacent antenna elements being equal to half of average wavelength $\lambda$ of the emitted radar signal and the arrangement including at least one triple of adjacent antenna elements, in which the two antenna elements located on the outside in the triple, on the one hand, and the interposed antenna element, on the other hand, originate in opposite directions from the connecting line.

BACKGROUND INFORMATION

In conventional radar sensors of this type, the antenna elements are alternately arranged on opposite sides of the connecting line. Since the distance from antenna element to antenna element is $\lambda/2$, the supplied signals at the locations of two adjacent antenna elements are in phase opposition. However, since the antenna elements are situated on opposite sides of the connecting line, a positive amplitude taper results for all antenna elements.

The antenna elements and the connecting line may be designed in microstrip conductor technology. In other radar sensors, the antenna arrangement may also be formed, however, by waveguide or SIW (substrate integrated waveguide) antennas. If the antenna elements are designed in microstrip conductor technology, the amplitude taper of the antenna elements may be set by varying the width and length of the individual antenna patches in such a way that side lobes are largely suppressed in the directional characteristic of the antenna arrangement. This applies both to the emitted power in emitting antennas and to the direction-dependent sensitivity in receiving antennas.

However, even with good side lobe suppression, the radar sensors have a relatively fuzzily restricted field of view, since the emitted power and the sensitivity only drop gradually as a function of the directional angle at the edges of the field of view. In certain applications, undesirable effects may thus occur, for example, interference signals as a result of reflections from irrelevant objects at the edge of the field of view.

In autonomous driving systems for motor vehicles, the demands on the sensors are generally increasing and a larger number of radar sensors is often installed in a single vehicle. It is becoming increasingly difficult to find suitable installation locations at the vehicle for these radar sensors, at which the signal is not disturbed by vehicle structures in the surroundings of the sensor, for example, by parts of bumpers, emblems attached to the bumpers, and the like. The sensitivity to such sources of interference is increased by the fuzzy restriction of the fields of view of the radar sensors.

SUMMARY

An object of the present invention is to provide a radar sensor having a more sharply restricted field of view.

This object may be achieved according to an example embodiment of the present invention in that the antenna arrangement includes at least one pair of antenna elements, which originate in opposite directions from the connecting line and the distance of which is an integer multiple of wavelength $\lambda$, so that one of these elements has a negative amplitude taper in relation to the antenna elements of the triple.

Since the signals fed into these two antenna elements are in phase, a negative amplitude taper results due to the opposite arrangement of the antenna elements. Additional scope for the beamforming is provided by the possibility of implementing such negative amplitude tapers.

If a sharply restricted field of view is desired, the curve which depicts the directional characteristic, thus the angle dependence of the antenna gain, has an approximately rectangular form. Within a restricted angle range around the 0° direction, the antenna gain is approximately constant, while it drops sharply at the edges of the field of view. The relationship between the directional characteristic and the amplitude taper of the antenna array is given in principle by a Fourier transform. The Fourier transform of a rectangular function has an oscillating behavior so that in addition to positive coefficients, negative coefficients also occur in the amplitude taper. Since such negative amplitude tapers may be represented using the antenna arrangement according to the present invention, a directional characteristic may be achieved which approximates a rectangular shape.

This is applicable both in emitting antennas and in monostatic antenna concepts in which the antenna elements both emit and receive, and also in solely receiving antennas, although in the latter case the connecting line is a receiving line, while in the other cases it is a feed line.

Advantageous embodiments of the present invention are disclosed herein.

An exemplary embodiment of the present invention is explained in greater detail hereinafter on the basis of the figures.

DETAILED DESCRIPTION OF EXAMPLE EMBODIMENTS

Figure 1:
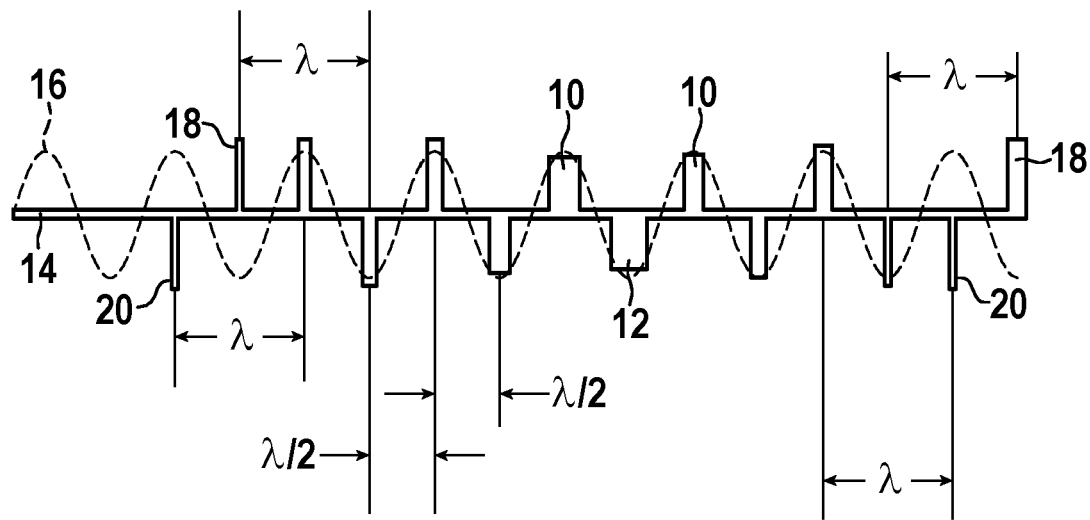
FIG. 1 shows an antenna arrangement in a radar sensor according to an example embodiment of the present invention.

FIG. 1 shows an example of an antenna arrangement according to the present invention in a radar sensor. The antenna arrangement is formed in this example in microstrip conductor technology on a substrate (not shown) and includes a plurality of antenna elements 10, 12, which are situated, at least in a central area of the antenna arrangement, alternately on opposite sides of a linearly extending connecting line 14. Antenna elements 10, 12 are fed in series with microwave energy via connecting line 14.

In the example shown, the left end of connecting line 14 in FIG. 1 is connected to a signal source (not shown). The signal originating from this signal source is reflected at the right end of the connecting line in FIG. 1, so that a standing wave 16 forms in the connecting line, which is shown by dashed lines in the figure. Wavelength $\lambda$ of this wave is determined by the frequency of the radar signal to be emitted. In practice, the frequency of the radar signal is mostly modulated within a certain frequency band. The antenna arrangement is designed for a frequency which corresponds to the center of this frequency band. The distance between an antenna element 10 on one side of connecting line 14 and next antenna element 12 on the opposite side of the connecting line corresponds in each case to half of wavelength λ.

Antenna elements 10, 12 are each located in the position of the antinodes of standing wave 16. Due to the distance of λ/2, the signals at the positions of antenna elements 10 on the one side are in phase opposition to the signals at the positions of antenna elements 12 on the opposite side. However, since antenna elements 10 and 12 originate in opposite directions from connecting lines 14, the oscillating dipole moments and accordingly the emitted radar waves are in phase. The coefficients which describe the amplitude taper of antenna elements 10, 12 therefore have the same sign. For example, all amplitude tapers are positive for antenna elements 10 and 12. This may be seen in the drawing in that the pattern of antenna elements 10, 12 roughly depicts the elongation of standing wave 16.

Each two of antenna elements 10 and interposed antenna element 12 form a triple, in which outer antenna elements 10 originate in one direction from the connecting line and middle antenna element 12 in the opposite direction. This also applies to triples made up of two antenna elements 12 and an interposed antenna element 10. The antenna arrangement shown in FIG. 1 has multiple such triples in its middle area.

However, according to the present invention, this pattern is disrupted in the area of the ends of the antenna arrangement. There are antenna elements 18 there which are on the same side of connecting line 14 as antenna elements 10, but whose distance to antenna elements 12 on the opposite side is an integer multiple of wavelength λ in each case, however. There are also antenna elements 20 which are on the same side as antenna elements 12, but whose distance to antenna elements 10 on the opposite side is also an integer multiple of λ. For these antenna elements 18, 20, the amplitude taper is negative, which may be seen in the drawing in that the direction in which antenna elements 18, 20 originate from connecting line 14 is opposite to the direction of the elongation of standing wave 16. A rather rectangular directional characteristic is achieved by this noncontinuous positive amplitude taper.

In the example shown, antenna elements 18, 20 having negative amplitude taper are located at the opposite ends of the antenna arrangement and their mutual distance is λ/2.

As may furthermore be seen in FIG. 1, antenna elements 10, 12, 18, 20 have different lengths and widths. The absolute values of the amplitudes are modified in a conventional way by these variations of the length and width so that side lobes in the directional characteristic are largely suppressed.

The above-described antenna arrangement may be used not only in emitting antennas but also in monostatic antenna concepts in which antenna elements 10, 12, 18, 20 both emit and receive, and also in solely receiving antennas.

Figure 2:
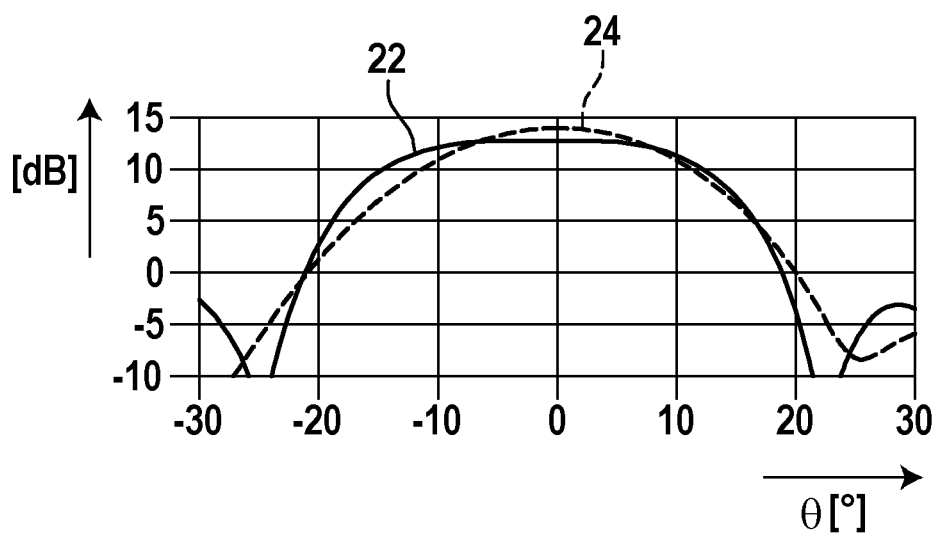
FIG. 2 shows directional characteristics for two different antenna arrangements.

Examples of directional characteristics of different antenna arrangements are shown in FIG. 2. Curve 22 shown by solid lines in FIG. 2 indicates the directional characteristic for the antenna arrangement shown in FIG. 1. The directional characteristic is given by the antenna gain (in dB) as a function of angle θ at which the radar radiation is emitted or received, the 0° direction being the direction perpendicular to connecting line 14, perpendicular to the plane of the drawing in FIG. 1. For comparison, a curve 24 shown by dashed lines indicates the directional characteristic of a conventional antenna arrangement in which the pattern of antenna elements 10 and 12 located alternately on opposite sides continues over the entire length of the antenna arrangement. It may be seen that curve 24 for the conventional antenna arrangement has a clear maximum at 0° and already drops off considerably at relatively small angles to both sides. In curve 22 for the antenna arrangement according to the present invention, in contrast, the maximum is flatter. At 0°, the antenna gain is somewhat less than in curve 24, but it remains approximately constant in an angle range of up to approximately +/−10°. At larger angles, in contrast, curve 22 drops off relatively steeply, while curve 24 decays essentially more slowly here. Side lobes at angles in the vicinity of +/−30° are suppressed approximately equally well in both curves.

Figure 3:
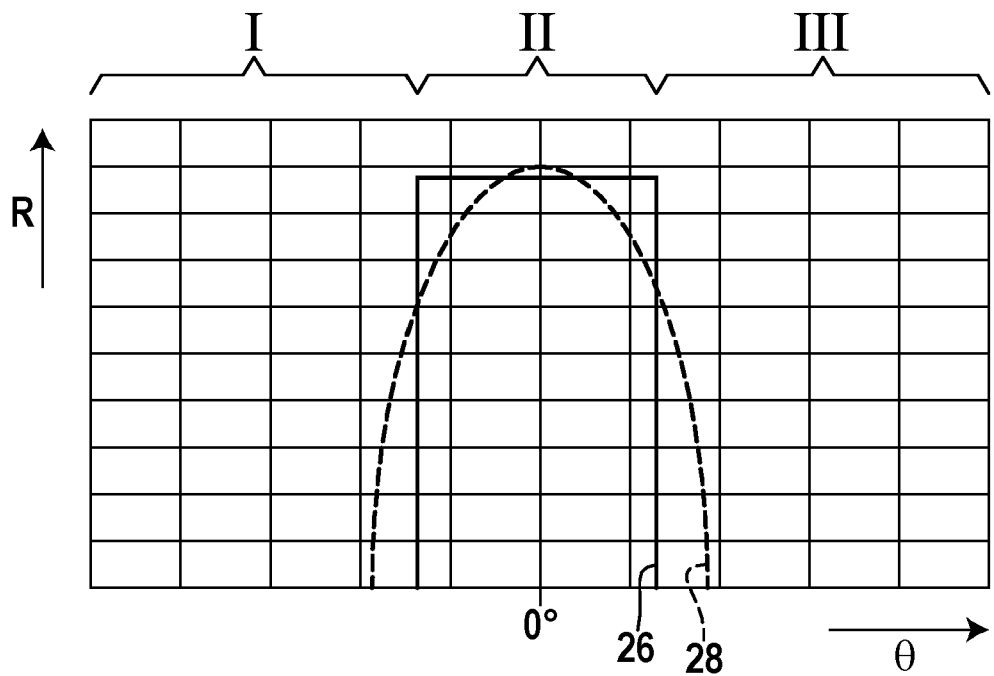
FIG. 3 shows idealized representations of directional characteristics of a conventional radar sensor and a radar sensor according to an example embodiment of the present invention.

Curve 22 for the antenna arrangement according to the present invention comes considerably closer to a desired rectangular shape than curve 24 for the conventional antenna arrangement. In FIG. 3, the angle dependence of range R for radar sensor having an antenna arrangement according to the present invention (curve 26) and for a conventional radar sensor (curve 28) is shown in idealized form. The radar sensor according to the present invention has an approximately constant range in a core zone II, while the range abruptly decreases at the transition into edge zones I and III. The width of core zone II is selected in practice in such a way that it covers the angle range relevant for the vehicle guidance. Since radar echoes are hardly received from edge zones I and III, interference signals from these edge zones are largely suppressed, due to which the evaluation and interpretation of the radar signals is facilitated. In the course of a development in which more and more vehicles are equipped with radar sensors, in addition, as a further advantage, fewer interference signals are caused for the radar sensors of oncoming vehicles.

In the conventional radar sensor (curve 28), in contrast, the range is also still relatively high in edge zones I and III, so that the number of the interference signals is correspondingly greater.

In the antenna arrangement according to the present invention, edge zones I and III are not illuminated during emitting operation, and the energy which thus becomes free is used to achieve a higher and uniform sensitivity in core zone II. In the 0° direction, the range of this radar sensor according to the present invention is somewhat less than that of the conventional sensor, but this minor reduction of the range, which is restricted to a very narrow angle range, may readily be accepted.

Figure 4:
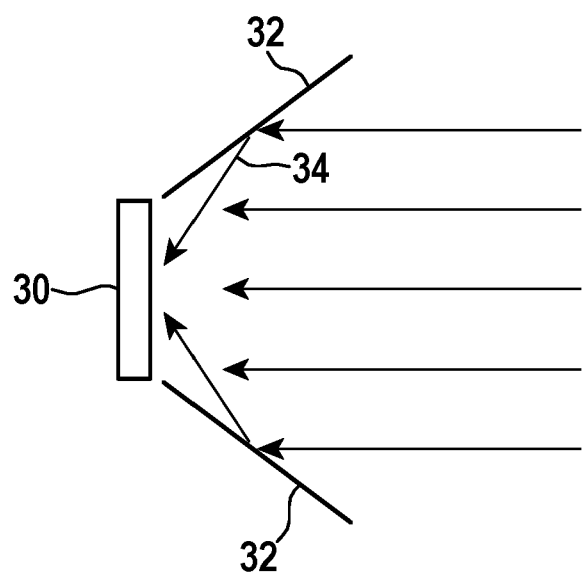
FIG. 4 shows an example of an installation situation of a radar sensor in a motor vehicle.

A further advantage of the antenna arrangement according to the present invention and the directional characteristic thus achieved is illustrated in FIG. 4. An installation situation is shown here in which a radar sensor 30 is installed in a motor vehicle in such a way that it is located between two other components 32 of the motor vehicle. These other components 32 form reflection surfaces which reflect a part of the incident radar echo and guide it at a relatively large angle onto radar sensor 30. Radar signals 34 reflected in this way form undesirable interference signals. In the radar sensor according to the present invention, these reflected signals 34 are located in edge zones I and III, however, in which the sensitivity is zero or very small, so that the interference signals are automatically suppressed. In this way, in particular in the case of the installation of a large number of radar sensors in a motor vehicle, a greater design freedom is achieved with respect to the positioning of the radar sensors.

What is claimed is:

1. A radar sensor for a motor vehicle, comprising:
an antenna arrangement which includes multiple antenna elements arranged linearly at uniform distances along a linearly extending connecting line, a distance between each two of the adjacent antenna elements being equal to half of a mean wavelength $\lambda$ of an emitted radar signal, the arrangement including at least three adjacent antenna elements, in which each of a pair of the adjacent antenna elements is located on an outside position with respect to one of the adjacent antenna elements, which is an interposed antenna element located between the pair of the adjacent antenna elements, so that, the interposed antenna element and the pair of the adjacent antenna elements form a triple, and originate in opposite directions from the connecting line;
wherein the antenna arrangement includes at least a first antenna element positioned on a same side as the pair of the adjacent antenna elements, wherein a distance from the first antenna element to the interposed antenna element on the opposite side is an integer multiple of the mean wavelength $\lambda$, so that an amplitude taper is negative, and
wherein the antenna arrangement includes at least a second-antenna element positioned on a same side as the interposed antenna element, wherein a distance from the second antenna element to the interposed antenna element on the opposite side is an integer multiple of the mean wavelength $\lambda$, so that another amplitude taper is negative.

2. The radar sensor as recited in claim 1, wherein the antenna elements in a middle section of the connecting line originate alternately in opposite directions from the connecting line and the at least one of the antenna elements having a negative amplitude taper is located outside the middle section.

3. The radar sensor as recited in claim 1, wherein the antenna arrangement includes at least two antenna elements having a negative amplitude taper, which originate in opposite directions from the linearly extending connecting line.

4. The radar sensor as recited in claim 3, wherein the first antenna element and the second antenna element having the negative amplitude taper have a distance between one another of a wavelength of mean $\lambda/2$ in relation to one another, and wherein the first antenna element and the second antenna element are located at opposite ends of the linearly extending connecting line.

5. The radar sensor as recited in claim 3, wherein the antenna elements are fed in series with microwave energy via the linearly extending connecting line.

6. The radar sensor as recited in claim 1, wherein a gain of the antenna arrangement is approximately constant in a core zone in an angle range of up to +/−10°.

* * * * *